United States Patent
Lee

(10) Patent No.: US 10,272,357 B2
(45) Date of Patent: Apr. 30, 2019

(54) MINERAL COMPOSITION FOR GENERATING SMALL WATER CLUSTERS, A SMALL WATER CLUSTER GENERATING DEVICE AND A SEAWATER DESALINATION EQUIPMENT USING THE SAME, AND A SMALL WATER CLUSTER GENERATING METHOD

(71) Applicant: Yueh-Huan Lee, Taipei (TW)

(72) Inventor: Yueh-Huan Lee, Taipei (TW)

( * ) Notice: Subject to any disclaimer, the term of this patent is extended or adjusted under 35 U.S.C. 154(b) by 308 days.

(21) Appl. No.: 14/703,581

(22) Filed: May 4, 2015

(65) Prior Publication Data
US 2016/0214029 A1 Jul. 28, 2016

(30) Foreign Application Priority Data
Jan. 22, 2015 (TW) .............................. 104102142 A

(51) Int. Cl.
*B01D 3/34* (2006.01)
*C08K 3/38* (2006.01)
(Continued)

(52) U.S. Cl.
CPC ............... *B01D 3/34* (2013.01); *C02F 1/04* (2013.01); *C08K 3/26* (2013.01); *C08K 3/34* (2013.01);
(Continued)

(58) Field of Classification Search
CPC ... B01D 3/34; C08K 3/38; C08K 3/34; C08K 3/346; C08K 3/26; C02F 1/04; C02F 1/30
See application file for complete search history.

(56) References Cited

U.S. PATENT DOCUMENTS

| 4,054,493 A * | 10/1977 | Roller ................... B01D 1/285 159/16.3 |
| 2007/0193872 A1* | 8/2007 | Garcia ................. B01D 1/0035 202/234 |

(Continued)

FOREIGN PATENT DOCUMENTS

| TW | 200727835 | 8/2007 |
| TW | I388508 | 3/2013 |

OTHER PUBLICATIONS

"Bleaching Earth | AMC Adsorbents," http://www.amcadsorbents.com/bleaching-earth obtained using Wayback Machine from Aug. 5, 2013.*

(Continued)

*Primary Examiner* — Matthew D Krcha
(74) *Attorney, Agent, or Firm* — Muncy, Geissler, Olds & Lowe, P.C.

(57) ABSTRACT

A mineral composition for generating small water clusters, a small water cluster generating device and a seawater desalination equipment using the same and a small water cluster generating method are provided. The mineral composition includes a tourmaline, a quartz, a bleaching earth, a dolomite, a shale, and a porcelain clay. The small water cluster generating device includes the mineral composition and an energy supplying unit for supplying energy. The seawater desalination equipment includes the mineral composition, a heat supplying unit, and a cooling unit. The small water cluster generating method includes using the mineral composition on water or a solution and providing the energy.

10 Claims, 4 Drawing Sheets

(51) Int. Cl.
*C08K 3/34* (2006.01)
*C08K 3/26* (2006.01)
*C02F 1/04* (2006.01)
*C02F 103/08* (2006.01)

(52) U.S. Cl.
CPC ............... *C08K 3/346* (2013.01); *C08K 3/38* (2013.01); *C02F 2103/08* (2013.01); *C02F 2305/00* (2013.01); *C08K 2003/265* (2013.01); *C08K 2003/267* (2013.01); *Y02A 20/128* (2018.01)

(56) References Cited

U.S. PATENT DOCUMENTS

2014/0302163 A1\* 10/2014 Sanchez ............... A61K 31/714
424/600
2016/0194223 A1\* 7/2016 Landis ..................... C09C 1/00
205/742

OTHER PUBLICATIONS

"DigitalFire Reference Database," https://digitalfire.com/4sight/material/ kaolin_925.html obtained using Wayback Machine from Oct. 8, 2013.\*

"HydroPlus Alkaline Antioxidant Water," http://novita.com.sg/web/HydroPlusVideo/smaller-water-molecule-cluster-size.html (Year: 2019).\*

"Small Cluster Bottled Water," http://rainter.com/portfolio/lorem-ornare/ (Year: 2019).\*

\* cited by examiner

MINERAL COMPOSITION FOR GENERATING SMALL WATER CLUSTERS, A SMALL WATER CLUSTER GENERATING DEVICE AND A SEAWATER DESALINATION EQUIPMENT USING THE SAME, AND A SMALL WATER CLUSTER GENERATING METHOD

BACKGROUND OF THE INVENTION

1. Field of the Invention

This invention generally relates to a mineral compound for generating small water clusters, a small water cluster generating device and a seawater desalination equipment using the same, and a small water cluster generating method.

2. Description of the Prior Art

A water cluster is a discrete hydrogen bonded assembly or cluster of molecules of water. A large water cluster is cluster of 16-18 molecules of water, wherein a small water cluster is cluster of 7-9 molecules of water. General methods to reduce the size of water cluster include treating with Far-infrared, ultrasonic wave, electromagnetic field, magnetic field, etc. The small water clusters generated by the above methods are unable to maintain in small-water-cluster state since the hydrogen bonds between the water molecules are merely temporarily broken by an outer sourcing energy. Once the outer sourcing energy vanishes, the hydrogen bonds between the water molecules recover and large water clusters are formed again.

General methods to desalinate seawater include reverse osmosis and distillation. The reverse osmosis method makes the seawater pass a reverse osmosis membrane by high pressure and accomplishes desalination by using the size difference between the water molecule and other particles. The advantage is low power consumption, wherein the disadvantage is higher membrane material and machine maintenance cost and lower quality of desalination water. The distillation method separates the water molecule and other particles by using the difference between their boiling points. The advantage is higher quality of desalination water, wherein the disadvantage is high power consumption.

SUMMARY OF THE INVENTION

It is an object of the present invention to provide a mineral composition for generating small water clusters, a small water cluster generating device and a seawater desalination equipment using the same.

It is another object of the present invention to provide a small water cluster generating method.

The mineral composition of the present invention includes a tourmaline, a quartz, a bleaching earth, a dolomite, a shale, and a porcelain clay, wherein the weight percent of the tourmaline based on the total weight of the mineral composition is between 5 wt % and 15 wt %; the weight percent of the quartz based on the total weight of the mineral composition is between 5 wt % and 15 wt %; the weight percent of the bleaching earth based on the total weight of the mineral composition is between 25 wt % and 35 wt %; the weight percent of the dolomite based on the total weight of the mineral composition is between 15 wt % and 20 wt %; the weight percent of the shale based on the total weight of the mineral composition is between 15 wt % and 20 wt %; the weight percent of the porcelain clay based on the total weight of the mineral composition is between 5 wt % and 25 wt %.

In an embodiment, the weight percent of the tourmaline based on the total weight of the mineral composition is 10 wt %, the weight percent of the quartz based on the total weight of the mineral composition is 10 wt %, the weight percent of the bleaching earth based on the total weight of the mineral composition is 30 wt %, the weight percent of the dolomite based on the total weight of the mineral composition is 15 wt %, the weight percent of the shale based on the total weight of the mineral composition is 15 wt %, and the weight percent of the porcelain clay based on the total weight of the mineral composition is 20 wt %. The mineral composition is made by sintering at temperature between 300° C. and 500° C. over 1 hour. The mineral composition is able to absorb an energy and emit a short-wavelength light wave. The energy is selected from the group consisting of heat energy, electromagnetic energy, luminous energy, radiant energy, and a combination thereof. The wavelength of the short-wavelength light wave is 4~30 μm.

The small water cluster generating device includes the above mentioned mineral composition. The small water cluster generating device further includes an energy supplying unit for supplying the energy.

The seawater desalination equipment includes the above mentioned mineral composition, a heat supplying unit, and a cooling unit. The mineral composition is for emitting a short-wavelength light wave to a feeding seawater. The heat supplying unit is for evaporating the feeding seawater to a discharging water vapor. The cooling unit is for condensing the discharging water vapor to a desalination water. The wavelength of the short-wavelength light wave is 4~30 μm. The seawater desalination equipment further includes a distillation chamber including a first section and a second section isolated from each other. The first section contacts with the feeding seawater, wherein the mineral composition and the heat supplying unit are disposed in the first section. The second section contacts with the discharging water vapor, wherein the cooling unit is disposed in the second section.

The seawater desalination equipment further includes a heating unit, wherein the heat supplying unit and the cooling unit are disposed in opposite sides of a heat exchanging unit, wherein the feeding seawater is in the side of the heat exchanging unit corresponding to the heat supplying unit and is delivered to the heating unit after vaporized to the discharging water vapor, wherein after heated by the heating unit, the discharging water vapor is delivered to the side of the heat exchanging unit corresponding to the cooling unit for condensing the discharging water vapor to the desalination water. The heating unit includes a solar evacuated tube. The seawater desalination equipment further includes a pre-heating unit, wherein the feeding seawater and the desalination water perform heat exchanging in the pre-heating unit without mixing.

The small water cluster generating method includes using the mineral composition on water or a solution. The method further includes providing an energy, wherein the mineral composition is able to absorb the energy and emit a short-wavelength light wave. The energy is selected from the group consisting of heat energy, electromagnetic energy, luminous energy, radiant energy, and a combination thereof. The wavelength of the short-wavelength light wave is 4~30 μm.

DETAILED DESCRIPTION OF THE PREFERRED EMBODIMENT

Figure 1A:
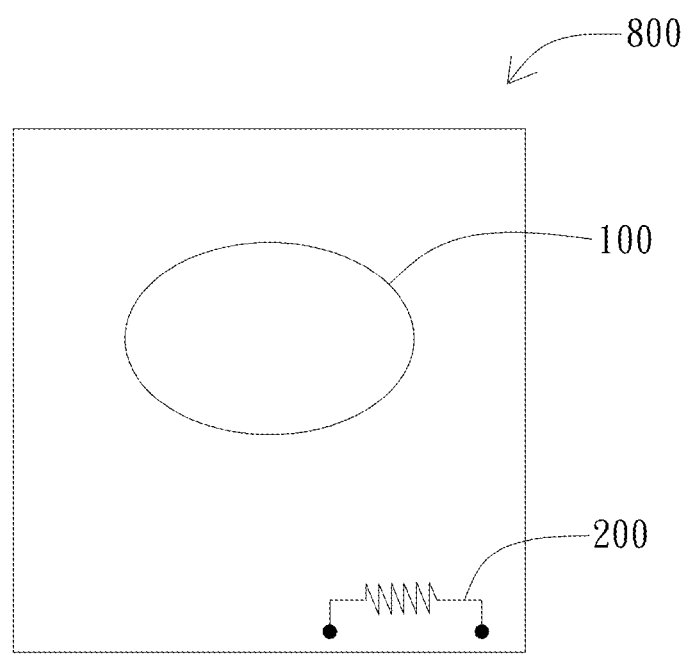
FIG. 1A is a schematic view of an embodiment of the small water cluster generating device of the present invention.

The mineral composition of the present invention includes a tourmaline, a quartz, a bleaching earth, a dolomite, a shale, and a porcelain clay, wherein the weight percent of the tourmaline based on the total weight of the mineral composition is between 5 wt % and 15 wt %; the weight percent of the quartz based on the total weight of the mineral composition is between 5 wt % and 15 wt %; the weight percent of the bleaching earth based on the total weight of the mineral composition is between 25 wt % and 35 wt %; the weight percent of the dolomite based on the total weight of the mineral composition is between 15 wt % and 20 wt %. The weight percent of the shale based on the total weight of the mineral composition is between 15 wt % and 20 wt %; the weight percent of the porcelain clay based on the total weight of the mineral composition is between 5 wt % and 25 wt %. In the preferred embodiment, the weight percent of the tourmaline based on the total weight of the mineral composition is 10 wt %, the weight percent of the quartz based on the total weight of the mineral composition is 10 wt %, the weight percent of the bleaching earth based on the total weight of the mineral composition is 30 wt %, the weight percent of the dolomite based on the total weight of the mineral composition is 15 wt %, the weight percent of the shale based on the total weight of the mineral composition is 15 wt %, and the weight percent of the porcelain clay based on the total weight of the mineral composition is 20 wt %. In the preferred embodiment, The mineral composition is made by sintering at temperature between 300° C. and 500° C. over 1 hour. In a different embodiment, however, the temperature and time for sintering the mineral composition can be varied depending on the composition, the amount of content, and the manufacturing requirement.

The mineral composition is able to absorb an energy and emits a short-wavelength light wave to break the water clusters into smaller water clusters. More particularly, the energy is selected from the group consisting of heat energy, electromagnetic energy, luminous energy, radiant energy, and a combination thereof. After absorbing the energy, the mineral composition emits the short-wavelength light wave to break the water clusters, wherein the wavelength of the short-wavelength light wave is 4~30 μm. The short-wavelength light wave makes water molecules become individual having low frequency oscillations and hence breaks the hydrogen bond between the water molecules. Furthermore, the water clusters are broken to form small water clusters.

Accordingly, the present invention provides a small water cluster generating device. As the embodiment shown in FIG. 1A, the small water clusters generating device 800 of the present invention includes the a mineral composition 100 as described. The surface of the mineral composition 100 is preferably porous for increasing the contact area with water. In a different embodiment, the shape of the mineral composition 100 can be varied depending on the manufacturing and using requirement. For example, the mineral composition 100 can be coated on the inner surface of the chamber of the small water cluster generating device 800 as particles, coated on the surface of a mesh, or disposed as a fluidized bed for increasing the contact area with water.

Figure 1B:
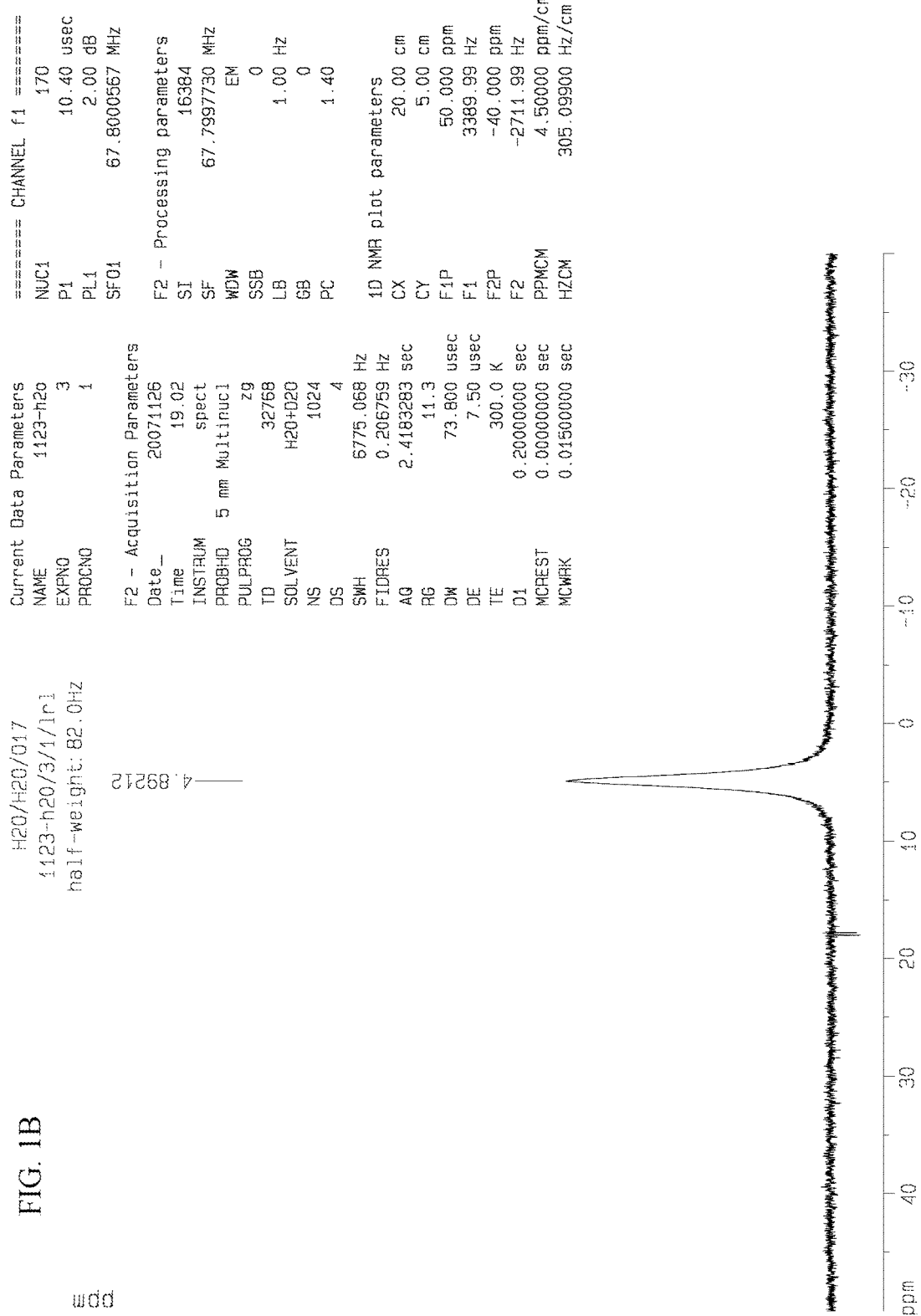
FIG. 1B is a NMR diagram of small water clusters generated by the small water cluster generating device of the present invention.

As the embodiment shown in FIG. 1A, the small water cluster generating device 800 preferably includes an energy supplying unit 200 for supplying the energy selected from the group consisting of heat energy, electromagnetic energy, luminous energy, radiant energy, and a combination thereof, wherein the efficiency of emitting short-wavelength light wave by the mineral composition 100 is therefore increased. Furthermore, the mineral composition 100 emits short-wavelength light wave as long as it absorbs the energy selected from the group consisting of heat energy, electromagnetic energy, luminous energy, radiant energy, and a combination thereof, wherein the energy can already exist in general environment. Therefore, the mineral composition 100 emits short-wavelength light wave even if there is no energy supplying unit 200. However, under the circumstance that the energy supplying unit 200 is provided, not only the supplying quantity of the energy can be ensured, but also the form (e.g. heat energy, electromagnetic energy, luminous energy, and luminous energy) and the way (e.g. heating by a resistor or heating by a solar evacuated tube) of energy supplying can be determined to increase the efficiency of emitting short-wavelength light wave by the mineral composition 100 (i.e. "the amount of emitted short-wavelength light wave"/"input work") and the efficiency of generating small water clusters by the small water clusters generating device 800 (i.e. "the amount of generated small water clusters"/"input work"). As the NMR diagram shown in FIG. 1B, measured by NMR on $O^{L7}$, the NMR half amplitude of the small water clusters generated by the small water cluster generating device of the present invention is 82 Hz, wherein a value of 120 Hz is obtained with general water. Accordingly, it can be known that the obtained small water cluster can maintain its small molecule over a long period of time.

The mineral composition of the present can be further used in seawater desalination. As the embodiment shown in FIG. 2, the seawater desalination equipment 900 of the present invention includes the mineral composition 100, a heat supplying unit 300, and a cooling unit 400. The mineral composition 100 emits the short-wavelength light wave to a feeding seawater 610. The heat supplying unit 300 evaporates the feeding seawater 610 to a discharging water vapor 620. The cooling unit 400 condenses the discharging water vapor 620 to desalination water 630.

Figure 2:
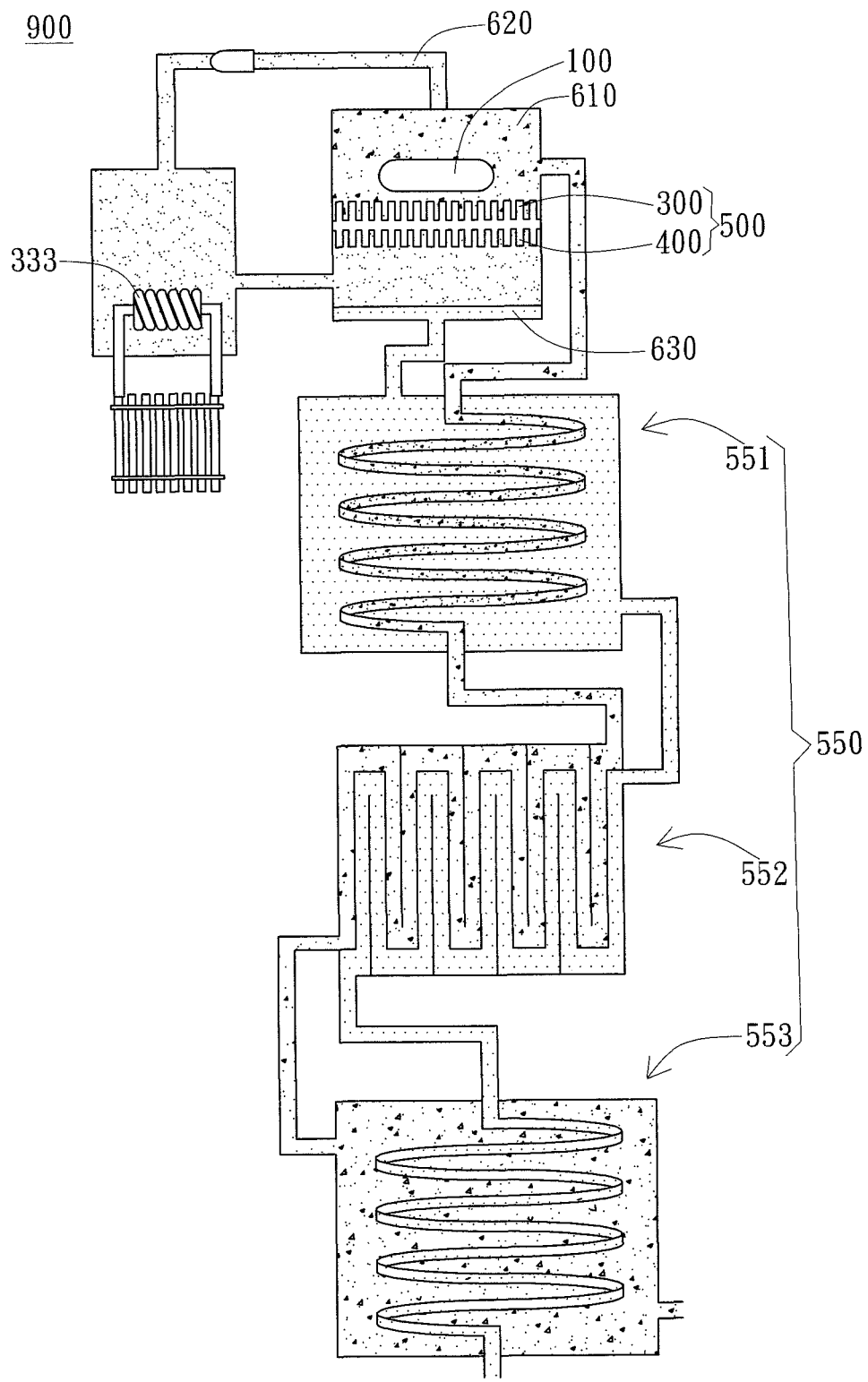
FIG. 2 is a schematic view of an embodiment of the seawater desalination equipment of the present invention.
Figure 3:
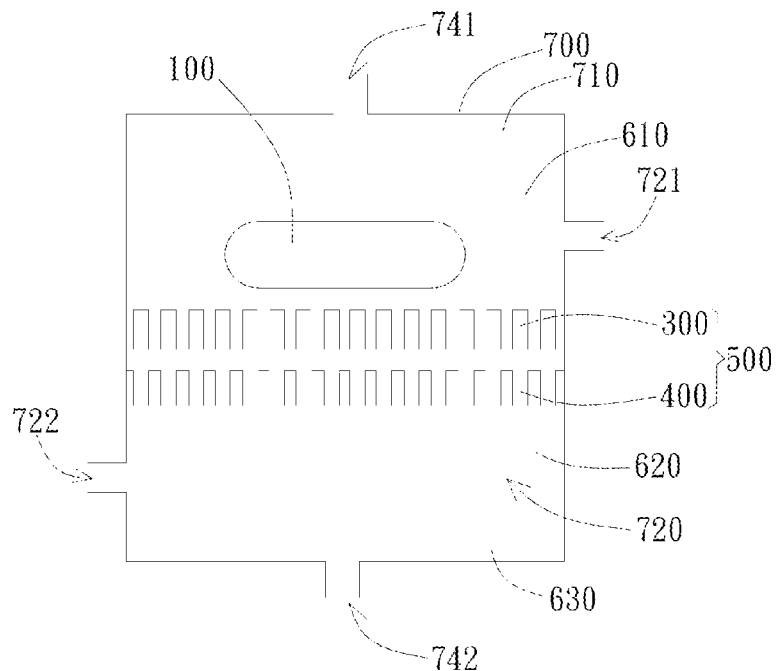
FIG. 3 is a schematic view of an embodiment of the distillation chamber in the seawater desalination equipment of the present invention.

As the embodiment shown in FIG. 2, the seawater desalination equipment 900 further includes a distillation chamber 700. More particularly, as the embodiment shown in FIG. 3, the distillation chamber 700 includes a first section 710 and a second section 720 isolated from each other. The first section 710 contacts with the feeding seawater 610, wherein the mineral composition 100 and the heat supplying unit 300 are disposed in the first section 710. The second section 720 contacts with the discharging water vapor 620, wherein the cooling unit 400 is disposed in the second section.

As the embodiment shown in FIG. 2, the seawater desalination equipment 900 further includes a heating unit 333. The heat supplying unit 300 and the cooling unit 400 are preferably disposed in opposite sides of a heat exchanging unit 500. The feeding seawater 610 enters from a distillation chamber first inlet 721 and is in the side of the heat exchanging unit 500 corresponding to the heat supplying unit 300. After vaporized to the discharging water vapor 620, it leaves through a distillation chamber first outlet 741 and is delivered (preferably by high temperature vapor pump) to the heating unit 333. After heated by the heating unit 300, the discharging water vapor 620 enters through a distillation chamber second inlet 722 and is delivered to the side of the heat exchanging unit 500 corresponding to the cooling unit 400 for condensing to desalination water 630 and leaves through a distillation chamber second outlet 742. The heating unit 333 is preferably a solar evacuated tube.

Furthermore, the first section 710 and the second section 720 can be isolated in the distillation chamber 700 by the heat exchanging unit 500. Since the first section has the feeding seawater having lower temperature, the second section has the heating unit 333 heated discharging water vapor 620 having higher temperature, and the heat exchanging unit 500 is disposed between the first section 710 and the second section 720, the temperature of the heat exchanger 500 would be between the feeding seawater 610 and the heating unit 333 heated discharging water vapor 620. In other words, for the feeding seawater 610, the side of the heat exchanging unit 500 corresponding to the first section 710 has higher temperature and is able to serve as a heat supplying unit 300 for supplying heat energy. For discharging water vapor 620 heated by the heating unit 333, the side of the heat exchanging unit 500 corresponding to the second section 720 has lower temperature and is able to serve as a cooling unit 400 for absorbing heat energy. In accordance with the above design, the energy efficiency can be raised.

On the other hand, the mineral composition 100 is able to absorb the heat energy released by the heat supplying unit 300 of the heat exchanging unit 500 and emits the short-wavelength light wave to make water molecules in the feeding seawater 610 become individual having low frequency oscillations, hence breaks the hydrogen bond between the water molecules and makes the water clusters form small water clusters. Thus, other materials originally included between the water clusters, such as sodium, calcium, magnesium, and other ions, are separated from the water molecules. Accordingly, the content of sodium, calcium, magnesium, and other ions in the discharging water vapor 620 are decreased, therefore improving the purity of the formed desalination water. In one embodiment, the desalination water formed by using the seawater desalination equipment 900 of the present invention has sodium less than 5 ppm.

As the embodiment shown in FIG. 2, the seawater desalination equipment 900 further includes a pre-heating unit 550, wherein the feeding seawater 610 and the desalination water 630 perform heat exchanging in the pre-heating unit 550 without mixing. More particularly, because the temperature of the desalination water 630 is higher than the feeding seawater 610, the heat energy of the desalination water 630 can be used to pre-heat the feeding seawater 610, e.g. makes the temperature of the feeding seawater 610 from a general seawater temperature of 20° C. to a target temperature of 100° C. near the distillation chamber 610, by using the pre-heating unit 550 composed of heat exchangers 551, 552, and 553 to further enhance the energy efficiency. The form, quantity, and orientation of the heat exchangers are not limited as shown in FIG. 2 and could be varied depending on the manufacturing and cost requirement.

In different embodiments, the mineral composition of the present invention can also be used in different kinds of seawater desalination equipment. For example, when applying the mineral composition of the present invention in reverse osmosis membrane type seawater desalination equipment, the mineral composition is able to emit the short-wavelength light wave to break the water clusters in the feeding seawater and form small water clusters. Thus, other materials originally included between the water clusters, such as sodium, calcium, magnesium, and other ions, are separated from the water molecules. Accordingly, it decreases the possibility of the water clusters passing through the reverse osmosis membrane together with sodium, calcium, magnesium, and other ions and therefore improves the purity of the formed desalination water.

Figure 4:
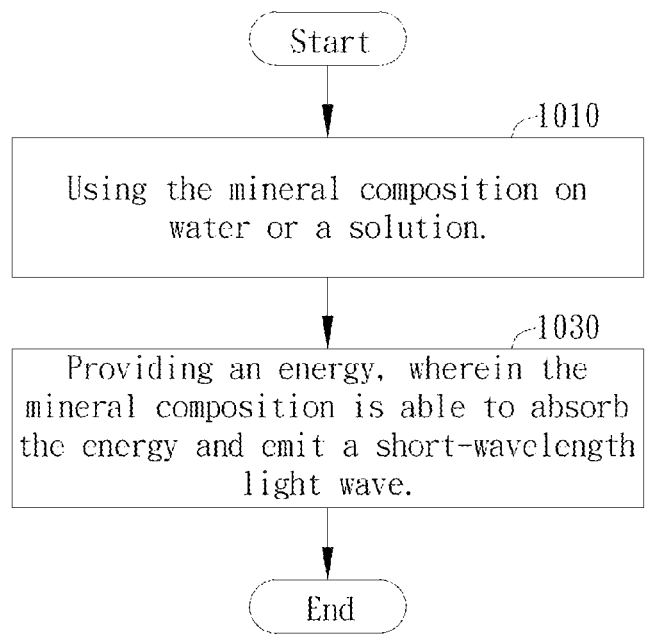
FIG. 4 is a flowchart of the small water cluster generating method of the present invention.

As the embodiment shown in FIG. 4, the small water cluster generating method includes the following steps.

Step 1010 involves the step of using the above mentioned mineral composition on water or a solution.

In the preferred embodiment, the method further includes step 1030 of providing an energy, wherein the mineral composition is able to absorb the energy and emit a short-wavelength light wave. The energy is selected from the group consisting of heat energy, electromagnetic energy, luminous energy, radiant energy, and a combination thereof. The wavelength of the short-wavelength light wave is 4~30 μm.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A mineral composition for generating small water clusters, comprising:
   a tourmaline, wherein the weight percent of the tourmaline based on the total weight of the mineral composition is 10 wt %;
   a quartz, wherein the weight percent of the quartz based on the total weight of the mineral composition is 10 wt %;
   a bleaching earth, wherein the weight percent of the bleaching earth based on the total weight of the mineral composition is 30 wt %;
   a dolomite, wherein the weight percent of the dolomite based on the total weight of the mineral composition is 15 wt %;
   a shale, wherein the weight percent of the shale based on the total weight of the mineral composition is 15 wt %; and
   a porcelain clay, wherein the weight percent of the porcelain clay based on the total weight of the mineral composition is between 20 wt %.

2. The mineral composition of claim 1, wherein the mineral composition is made by sintering at temperature between 300° C. and 500° C. over 1 hour.

3. The mineral composition of claim 1, wherein the mineral composition is able to absorb an energy and emit a short-wavelength light wave.

4. The mineral composition of claim 1, wherein the energy is selected from the group consisting of heat energy, electromagnetic energy, luminous energy, radiant energy, and a combination thereof.

5. The mineral composition of claim 1, wherein the wavelength of the short-wavelength light wave is 4~30 μm.

6. A small water cluster generating device comprising the mineral composition of claim 1.

7. A small water cluster generating method, comprising:
   providing the mineral composition of claim 1 in water or a solution; and
   providing an energy to the mineral composition.

8. The method of claim 7 wherein the mineral composition is able to absorb the energy and emit a short-wavelength light wave.

9. The method of claim 8, wherein the energy is selected from the group consisting of heat energy, electromagnetic energy, luminous energy, radiant energy, and a combination thereof.

10. The method of claim 8, wherein the wavelength of the short-wavelength light wave is 4~30 μm.

* * * * *